United States Patent [19]

Badessa

[11] 3,720,813
[45] March 13, 1973

[54] INTERPOLATIVE READOUT APPARATUS

[75] Inventor: Rosario S. Badessa, Dedham, Mass.

[73] Assignee: Damon Corporation, Needham Heights, Mass.

[22] Filed: Aug. 23, 1971

[21] Appl. No.: 173,790

Related U.S. Application Data

[63] Continuation-in-part of Ser. No. 105,878, Jan. 12, 1971.

[52] U.S. Cl. .........235/151.3, 235/151.35, 250/218, 356/180, 324/140
[51] Int. Cl. .........................G06g 7/30, G12b 13/00
[58] Field of Search..............235/151.3, 151.35, 183; 250/218; 356/180, 185, 195, 228, 88; 324/140; 73/1 R

[56] References Cited

UNITED STATES PATENTS

| | | | |
|---|---|---|---|
| 3,045,123 | 7/1962 | Frommer | 250/218 |
| 3,535,637 | 10/1970 | Goransson | 73/1 R |
| 3,529,895 | 9/1970 | Pincus | 356/179 |

OTHER PUBLICATIONS

Theory and Use of the Davidson and Hemmedinger Colorant Mixture Computer; Official Digest–Journal Paint Technology and Engr., Aug. 1965; pp. 895–908.

Primary Examiner—Malcolm A. Morrison
Assistant Examiner—Edward J. Wise
Attorney—Herbert W. Kenway et al.

[57] ABSTRACT

In the readout apparatus disclosed herein, the output signal level of a measuring circuit is, by interpolation, located or determined in relation to a pair of stored calibration voltage levels. The stored calibration voltage levels in turn correspond to measuring circuit output levels previously obtained in response to respective calibration samples applied to the same measuring circuit. The same interpolation process is simultaneously applied to position or derive a readout signal in relation to a pair of preselectable reference signals, the reference signal levels being preselected to correspond with the calibration samples which were previously used to establish the stored calibration signal levels.

15 Claims, 6 Drawing Figures

INTERPOLATIVE READOUT APPARATUS

This application is a continuation-in-part of application Ser. No. 105,878, filed Jan. 12, 1971.

BACKGROUND OF THE INVENTION

This invention relates to readout apparatus for a sample measuring system and more particularly to such a system which provides essentially automatic calibration with reference to preselected calibration standards and correlation with preselectable output levels corresponding to those standards even though a non-linear relationship may exist.

In various scientific measuring techniques, the actual parameter measured may be non-linearly related to the actual characteristic sought to be measured. Furthermore, the calibration or correspondence between the characteristic sought and the parameter actually measured may be unpredictable or otherwise difficult to establish so that calibration must be essentially empirically established. Typically, calibration is performed using pre-constructed calibration samples which are submitted to the testing or measuring system itself. For example, in the chemical analysis of blood constituents by photometric methods, the output signal from the photometer is typically not linearly related to the concentration of the constituent being sought. This non-linearity is contributed to not only by the nature of the photo-absorption process itself but also by non-linearities in the various chemical reactions employed to produce an optically measurable effect. Various steps have been proposed to compensate or correct for the logarithmic nature of the absorption mechanism and to compensate for errors which may be introduced by the photometer itself, e.g., the use of optical reference legs and balanced electronic bridges as well as analog computation circuitry to compensate for the logarithmic response of absorption photometry. In spite of such precautions, however, it has heretofore typically been difficult to provide any fully automatic compensation or calibration. Accordingly, system readouts have typically been in terms of arbitrary signal levels which must then be compared and corrected by comparison with the output signals obtained in response to calibration samples submitted to the same measuring apparatus. Thus, while it has heretofore been possible to partially automate blood constituent analysis, it has not typically been possible to provide a readout which was directly calibrated in terms of accepted units of concentration of the various measured constituents. The present apparatus permits such a readout and is suited for use in a system of the type disclosed in the commonly-assigned and copending application Ser. No. 105,805, for CONSTITUENTS-MEASURING CHEMICAL ANALYZER HAVING MULTIPLE CONCURRENTLY-OPERATED ALIQUOT-PROCESSING CONVEYORS, in the names of D. I. Kosowsky, A. Ferrari and C. Hurtig.

Among the several objects of the present invention may be noted the provision of readout apparatus for a sample measuring system which facilitates automatic calibration to predetermined calibration samples; the provision of such readout apparatus which provides automatic correlation between measured calibration sample values and preselected readout values; the provision of such a readout system which permits such calibration at a plurality of points corresponding to a series of calibration values; the provision of such readout apparatus which provides an output signal which is determined by a highly accurate interpolation between a pair of preselected reference levels corresponding to the closest calibration standards; the provision of such apparatus which permits essentially arbitrary preselection of the output levels which correspond to each calibration standard sample; the provision of such apparatus which provides a highly accurate readout; the provision of such apparatus which is reliable and which is relatively simple and inexpensive. Other objects and features will be in part apparent and in part pointed out hereinafter.

SUMMARY OF THE INVENTION

Briefly, readout apparatus according to the present invention is adapted for use with a sample measuring circuit providing a signal voltage at a level which is a function of the sought characteristic of a sample being measured. The readout apparatus employs at least a pair of calibration voltage storage circuits, the voltage being held by each of the storage circuits being set to a level corresponding to that signal voltage which is provided by the sample measuring circuit in response to a respective calibration sample.

A first interpolation switching circuit is provided which is adapted to repetitively switch between the two stored voltages thereby to provide an average voltage at an interpolation level which is a function of the duty cycle of the switching operation. Means, including a servo loop, are provided for varying the switching duty cycle so as to provide an average voltage equal to the signal voltage provided by the measuring circuit when a test sample is being measured.

A pair of adjustable output voltage sources are provided to supply preselectable output voltage reference levels corresponding to the calibration samples. A second interpolation switching circuit is operated in substantial synchronism with the first switching circuit and is connected so as to repetitively switch between the two output voltage reference levels, thereby to provide an output voltage whose average value is related to the two reference source voltages in the same manner as the average voltage provided by the first switching circuit is related to the two stored calibration voltages. Thus, the output voltage is thus also predictably related to the measured characteristic of the test sample, taking into account the similarly measured characteristics of the respective calibration samples.

DESCRIPTION OF THE PREFERRED EMBODIMENTS

Figure 1:
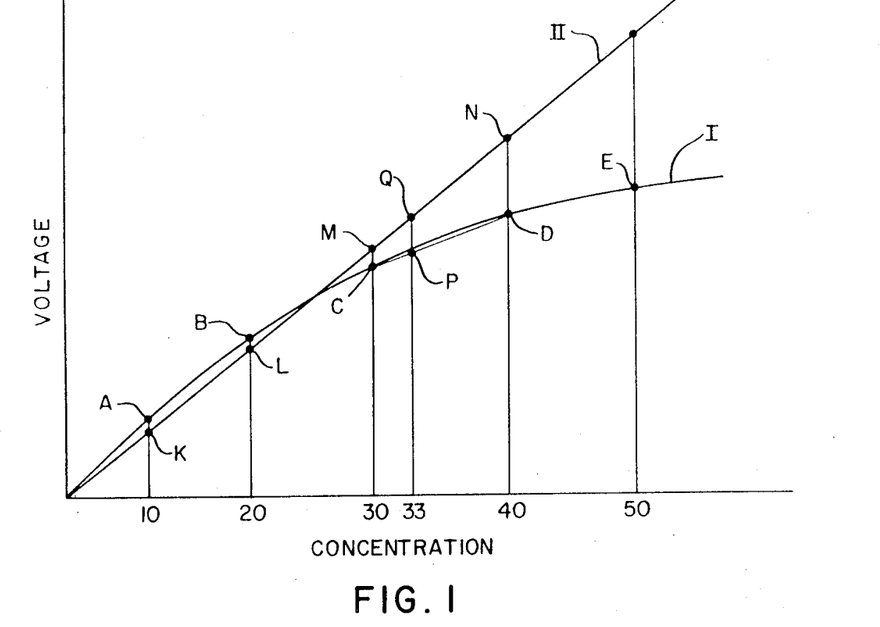
FIG. 1 is a chart useful in describing the interpolation process performed by apparatus operating in accordance with the present invention.

An understanding of the present apparatus is facilitated if there is first obtained an appreciation of the overall purpose and function of the apparatus, apart from the means now being disclosed for that purpose. Referring now to FIG. 1, the curve indicated at I represents the response of a measuring circuit. As noted previously, the invention does not concern itself with the particular parameter sought to be measured but rather with the calibration and readout of a measurement otherwise obtained. For purposes of the present explanation, it may be assumed that the curve indicated at I represents the output voltage of an absorption photometer measuring circuit, the ordinate, as a function of the concentration of the constituent sought to be measured. In FIG. 1, the concentration is indicated only in arbitrary units indicated at 10–50. As illustrated, the measuring circuit response is non-linear, as is typically the case for a variety of reasons as noted previously.

In order to determine this curve (I) for a given measuring circuit, e.g., a colorimeter, it is typically necessary to actually measure the output signal for at least a pair of specially created calibration samples. In FIG. 1, five calibration points on curve I are indicated at A–E. In the example illustrated, these calibration points are separated by equal increments of concentration level but it should be understood that the calibration points may be concentrated or spread out, if desired, so as to provide the best curve fitting. It should be understood also that, in colorimetry for example, it may be necessary to re-calibrate at fairly frequent intervals and that there may be some shifts in the output voltages provided by the standard calibration samples as various components age or become dirty, etc.

As noted previously, it is desirable to provide an output signal which is linearly representative of the concentration of the constituent being measured so as to facilitate understanding and analysis of the results obtained. This desired transfer characteristic is represented in FIG. 1 by the curve II which, as may be seen, is essentially a straight line. The points on this line corresponding to the standard concentration levels provided by the calibration samples are designated K–O.

As is explained in greater detail hereinafter, the interpolation process employed by the apparatus of the present invention is based upon the assumption that the response of the measuring circuit, curve I, can be satisfactorily approximated by a series of straight lines connecting the calibration points A–E. Making this assumption, it follows that the same process of interpolation which will locate an unknown sample's response between two calibration points on curve I will also serve to position the proper output voltage to represent the measured constituent concentration between the two corresponding reference points on Curve II. This may be represented in FIG. 1 as follows, taking as an example a constituent concentration of 33 on the arbitrary scale illustrated. Ignoring the slight difference between the actual response curve and the straight line segment approximation, the response of the measuring circuit to this concentration then can be indicated at P. Similarly, the desired output signal from the readout system may be represented at Q.

Graphically, it may be seen that the line segment MQ is to the line segment MN as the line segment CP is to the line segment CD. In order to generate an output voltage equivalent to that represented at Q, the apparatus of the present invention electronically performs an analagous interpolation process. In other words, the same interpolation process which is employed to locate the point P with respect to the point C and D is likewise used to position or generate the point Q with respect to the points M and N.

Figure 2:
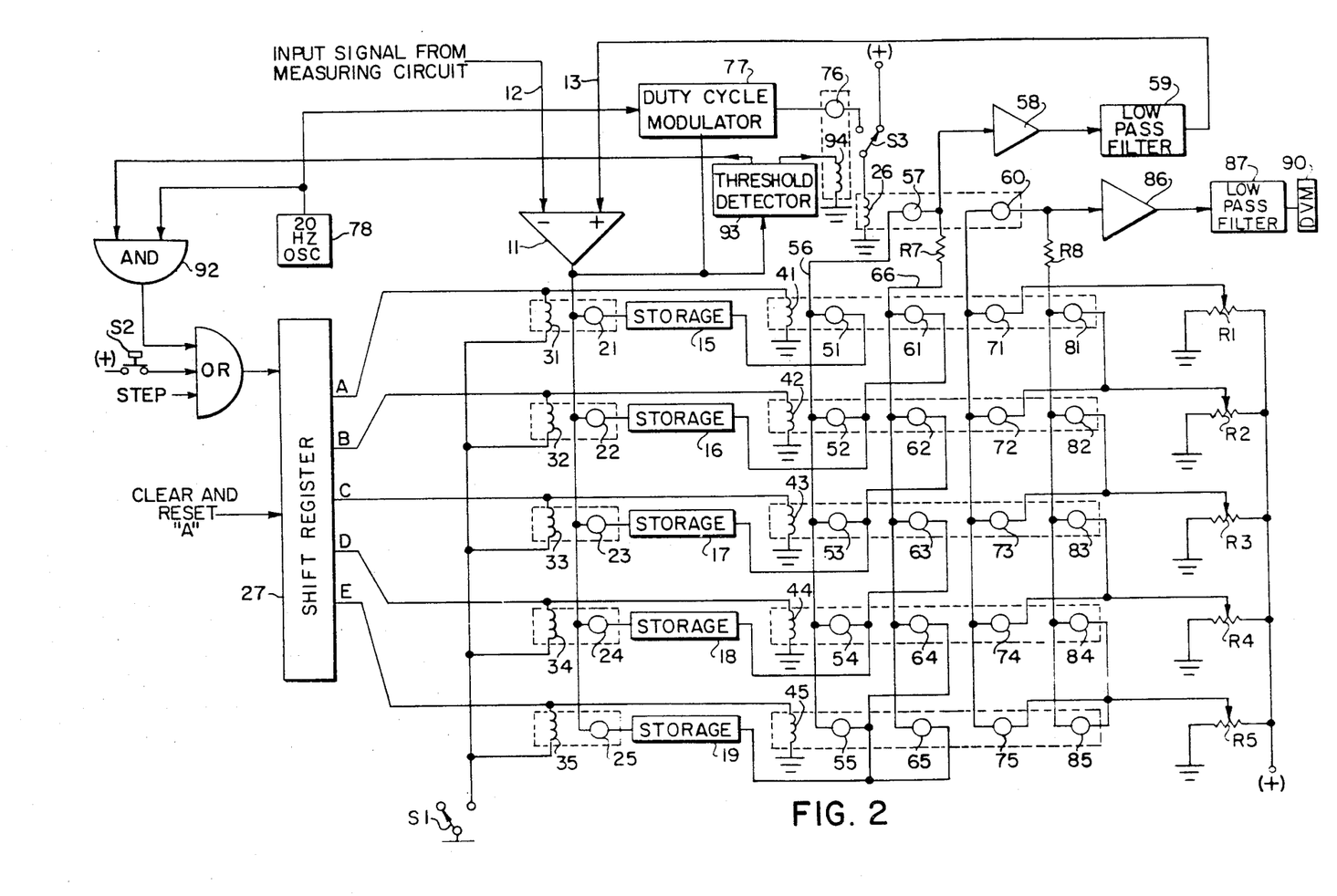
FIG. 2 is a somewhat schematic block diagram of interpolative readout apparatus constructed in accordance with the invention.

Referring now to FIG. 2, the signal obtained from the particular measuring circuit in use, e.g., a colorimeter, is applied to one input of a differential input amplifier 11. During certain portions of the operation of the illustrated apparatus, amplifier 11 functions as part of a servo control loop which balances a derived feedback signal against the measuring circuit signal. The derived signal is applied to the other (non-inverting) input of amplifier 11 through a lead 13. As will be understood by those skilled in the art, the output signal from amplifier 11 is thus in the nature of an error signal controlling the operation of the servo loop.

In one phase of the operation of the apparatus illustrated, the servo loop is employed to store calibration voltage levels corresponding to the measuring circuit signal amplitudes which are obtained when standard calibration samples are applied to the system. Voltage-storing or holding circuits for this purpose are indicated at 15–19. Storage circuits 15–19 are essentially conventional, e.g., of the type normally used for sample-and-hold circuits. For example, each such storage circuit may comprise a high-gain amplifier having a relatively low input current requirement, together with a low leakage capacitor connected in a negative feedback circuit around the amplifier. As is understood, such a circuit will provide an output voltage which may be adjusted by the application of current to the input of the amplifier and which will remain at the set value when the external input circuit is open-circuited, the holding period being limited only by the leakage and bias current requirements.

The input terminal of each of the storage circuits 15–19 is connected to the output terminal of the amplifier 11 through a respective set of normally open relay contacts 21–25. The respective relay windings controlling the contacts 21–25 are indicated at 31–35. In the apparatus illustrated, the various relays used are of the sealed magnetic reed variety. In the drawing, the winding and the various contacts comprising each relay are enclosed by broken lines to facilitate identification. One side of each of the windings 31–35 is connected to ground through a common switch S1, the relays being thus enabled only when the switch S1 is closed.

A shift register 27 is provided for selecting which one of the relay windings 31–35 may be energized at any given moment, assuming that the relays are enabled by the closure of switch S1. Shift register 27 also controls the operation of five other relay windings 41–45 which are employed in a selection of stored calibration voltages and output voltage reference levels, as described in greater detail hereinafter. As is conventional, the register may be reset to an initial state by the application of a suitable control signal, designated CLEAR AND RESET A. In this initial state the first selection relay winding 41 is energized as is the winding 31, assuming that switch S1 is closed. Likewise, the register 27 may be stepped or incremented by an external signal so as to energize successive ones of the relays in each set. The incrementing or "shift" signal is provided through an OR gate 14 having three input leads. Thus, register 27 may be advanced by any one of three different signals for various purposes as described in greater detail hereinafter.

The output terminals of the storage circuits 15–19 are connected, through respective normally open relay contacts 51–55 to a common line 56. This line is in turn connnected, through a set of normally open relay contacts 57, a high input impedance buffer amplifier 58 and a low-pass filter 59, to the feedback line 13 which drives the non-inverting input terminal of the error amplifier 11. Contacts 51–55 are controlled by the selection relay windings 41–45 mentioned previously. Contacts 57, together with a second set of normally open contacts 60, are controlled by a winding 26. Winding 26 is connected to a switch S3, being continuously energized when the switch is in its right hand position as shown. When the switch S3 is in its left hand position, the relay winding is connected, through a set of normally open contacts 76, to a duty cycle modulation circuit 77.

Assuming for the moment that the relay windings 41 and 26 are energized, it will be seen that a path is formed from the output terminal of the storage circuit 15 to the non-inverting input terminal of the error amplifier 11. Thus, since the contacts 21 are also closed, a feedback path is formed from the output terminal of error amplifier 11 back to its non-inverting input terminal. Thus, the output voltage from the storage circuit will be adjusted by the operation of the servo loop thereby formed so as to equal the value of the input signal provided by the measuring circuit. Although the feedback signal is applied to the non-inverting input terminal of the error amplifier 11, it may be noted that this signal, in fact, actually constitutes negative feedback since the integrators normally employed in the storage elements 15–19 provide a signal inversion. It is in this manner that the voltages stored in the circuits 15–19 are adjusted to levels corresponding to those which respective standard calibration samples produce when applied to the measuring circuit. While the full operating cycle is described in greater detail hereinafter, it may briefly now be noted that, for the purposes of this illustration, the values which are stored in the circuits 15–19 correspond to those represented by the points A–E in FIG. 1. As successive calibration samples are submitted to the system, the shift register is advanced correspondingly by the application of a "STEP" signal as one of the inputs of the OR gate 14 so that the respective selection relays are energized. This signal may be generated either manually or by external sequence control apparatus (not shown).

In the apparatus illustrated, voltages corresponding to the pairs K–O are provided by means of a series of manually adjustable potentiometers R1–R5 which act as adjustable output voltage reference sources. Each of these potentiometers is adjusted, in a manner described in greater detail hereinafter, to provide a reference voltage corresponding to the output voltage desired for a given respective standard or calibration sample concentration level. In other words, these potentiometers provide the output voltage levels represented at K–O in FIG. 1.

Interpolation between pairs of calibration voltage levels stored in the circuits 15–19 is accomplished by means of the relay contacts 57 which are operated to provide a time-sharing between the two voltages. As noted previously, the voltage level held in a selected one of the storage circuits 15–19 is applied, through a respective one of the selection relay contacts 51–55, to one side of the contacts 57. By means of a respective one of the contacts 61–65, the voltage level held in the next storage circuit in the sequence is applied to the other side of the switching relay contacts 57, through a common lead 66 and a resistance R7. As noted previously, only one of the selection relays is energized at any one time by the shift register 26 and thus, although the contacts 51–55 and 61–65 are connected to respective common lines, only one voltage level is applied to each line at any given time.

The value of resistor R7 is selected so that, when the contacts 57 are closed, this resistance does not significantly load the respective storage circuit 15–19. On the other hand, when the contacts 57 are open, the stored voltage applied through the respective one of contacts 61–65 is applied at essentially full value to the input of the buffer amplifier 58, owing to that buffer amplifier's high input impedance. It can thus be seen that the relay contacts 57 constitute a switching means for alternately applying either the stored calibration voltage level associated with the respective selection relay or the next higher calibration voltage, obtained from the adjacent storage circuit.

Assuming that the relay contacts 57 are repetitively operated at some nominal frequency, e.g., 20 Hz., it can be seen that the signal applied to the low-pass filter 59 will be a two-level or square-wave type signal having an average d.c. value which is between the two stored values which are being repetitively sampled. As will also be apparent to those skilled in the art, the actual value of the average d.c. level will depend upon the duty cycle of the switching. In other words, the actual intermediate value of the average d.c. level will depend upon the proportion of time over which each level is applied of the two voltages in relation to the total cycle time. The low-pass filter 59 removes the squarewave component and provides an essentially pure d.c. output at the aforementioned average d.c. level.

When the switch S3 is in its left hand position, the energization of the relay winding 26 may, as noted previously, be controlled by a duty cycle modulation circuit 77, assuming that the intermediate relay contacts 76 are closed. The duty cycle modulator circuit 77 operates to duty cycle modulate in a.c. clock signal provided by an oscillator 78 as a function of the output signal obtained from the error amplifier 11. In other words, the relay winding 26 will be repetitively energized at the frequency determined by the oscillator 78 with a duty cycle controlled by the amplitude of the error signal. A particular circuit for providing this operation is described in greater detail hereinafter.

Since the amplitude of the feedback or comparison signal provided back to the error amplifier 11 through the lead 13 depends, in this mode of operation, upon the duty cycle of the switching provided by the contacts 57 and since the duty cycle in turn depends upon the amplitude of the error signal, it can be seen that a feedback or servo loop has again been established. Assuming that the input signal obtained from the sample measuring circuit is at a voltage level which is between the two stored calibration levels being sampled, the servo loop will cause the feedback comparison signal on lead 13 to be adjusted to a value equal to the existing input signal.

When the servo loop has, in this manner, balanced the feedback signal on lead 13 with the input signal on lead 12, it can further be seen that the duty cycle of the contacts 57 is representative of the location of the interpolation point between the two stored calibration voltages. With reference to FIG. 1, if it is assumed that the two stored voltages being alternately sampled are those which are represented at points C and D and that the input and feedback signals are, at least approximately, represented by the point P, it can be seen that the duty cycle of the contacts 57 will correspond to the line segment CP while the total switching cycle period will correspond to the line segment CD.

The relay winding 26 also controls a second set of contacts 60 which, as is described in greater detail hereinafter, function as a second interpolating switching means operating in synchronism with the first interpolating switching means, i.e., the contacts 57. Output reference voltages corresponding to the two stored calibration voltages being sampled are obtained by means of the remaining pair of contacts operated by the respective selection relay. The lower reference voltage is applied through a respective one of the contacts 71-75, to one side of the interpolation switching contacts 60 while the next higher output reference voltage is applied to the other side of the switching contacts 60 through a resistance R8. Following the illustrative example begun previously, these reference voltages may be assumed to correspond to the points indicated at M and N in FIG. 1. This same side of the switching contacts 60 is connected to the input terminal of a high input impedance, unity-gain buffer amplifier 86 which, in turn, drives a low-pass filter 87. These latter elements are essentially similar to the elements 58 and 59 employed in the interpolation and generation of the feedback signal described previously.

The switching contacts 60 operate to interpolate between two of the output voltage reference levels in the same manner as the switching contacts 57 operate to interpolate between two of the stored calibration levels. Since the contacts 57 and 60 are under control of the same winding 26, they operate essentially synchronously and thus the duty cycle is essentially the same for both sets of contacts. Accordingly, the actual d.c. output of the filter 87 will bear the same relationship to the respective pair of output voltage reference levels as the feedback voltage bears to the respective pair of stored calibration voltages. As noted previously, the servo loop operation causes the feedback signal to be equal to the input signal. With reference to FIG. 1, this essentially means that a point Q will be located in relation to the points M and N as the point P is located in relation to the points C and D. For convenience, this output level is converted to digital form and displayed by a digital voltmeter 90.

In the description of the interpolation process given thus far, it has been assumed that the proper selection relay winding 41-45 was energized so that the voltage level of the input signal fell between the respective pair of stored calibration voltage levels. In the apparatus illustrated, the proper selection relay is automatically determined in the following manner. The low frequency clock signal provided by the oscillator 78 is also applied as one of the inputs to the OR gate 14 through an AND gate 92. The other input to AND gate 92 is provided by a level or threshold detecting circuit 93. The threshold detector 93 is, in turn, responsive to the output voltage of the error signal amplifier 11. The operation of the level detection circuit 93 and the AND gate 92 together is such that the clock signal is applied to the OR gate 14 only when the error signal is negative. As will be understood, the error signal is negative when the input signal is more positive than the feedback signal present on lead 13. The threshold detection circuit 93 also controls the energization of a winding 94 which operates the contacts 76, the contacts being closed only when the error signal is positive, i.e., when the input signal is negative with respect to the feedback signal.

With the switch S1 open and the switch S3 in its left hand position, a readout operation on a test sample signal is initiated by the application of a pulse to the shift register 27, i.e., the CLEAR AND RESET A signal. This pulse may conveniently be considered an interrogation pulse. With the first stage of the shift register 27 reset, the first of the selection relay windings (41) is energized. It is initially assumed that the relay winding 94 is de-energized so that the contacts 76 are open and the relay winding 26 is energized. The interpolation switching contacts 57 will thus also be open. Accordingly, the feedback voltage applied to the non-inverting input of the buffer amplifier 58 will be equal to that which is stored in the second calibration voltage storage circuit 16, this being the higher of the two calibration voltages which could be alternately applied to the buffer amplifier by means of the switching contacts 57. If the input signal from the sample measuring circuit is higher than the feedback signal, this is an indication that the value of the input signal does not lie between the first and second stored calibration voltages, i.e., does not lie within the line segment AB in FIG. 1. Assuming this is so, the output from the error signal amplifier 11 will be negative and the threshold detector circuit will not energize the relay winding 94. Likewise, the threshold detector will permit the next occurring pulse from the clock oscillator 78 to be passed by the AND gate 92 and to increment or advance the shift register 27. Accordingly, the next selection relay winding (42) will be energized, the first (41) being de-energized. If the input signal again does not lie between the respective pair of stored calibration voltages, the next clock pulse will similarly advance the shift register.

When the shift register reaches a state such that the then energized selection relay, e.g., 43, provides a pair of stored calibration voltages such that the higher of the pair is higher than the input signal, the output voltage of the error signal amplifier 11 will go positive. The threshold detector circuit 93 will then cause the contacts 76 to close and will likewise remove one of the two input signals from the AND gate 92 so that further oscillator clock pulses are blocked from the OR gate 14 and do not advance the shift register 27. When the contacts 76 close, the relay winding 26 is placed under the control of the duty cycle modulator 77, as described previously, with the duty cycle being varied under servo loop control.

In summary, the overall operation of this apparatus is as follows. To establish the readout values which are to correspond to the several standard calibration samples which are to be used in calibrating the apparatus, the switch S1 is left open and the switch S3 is placed in its right hand position so that the relay winding 26 is continuously energized. The shift register 27 is then manually incremented by means of a pushbutton switch S2 so that each selection relay winding 41-45 is energized in turn. As each selection relay is energized, the corresponding output reference voltage potentiometer R1-R5 is adjusted until the digital volt meter 90 indicates the desired output level. Since the contacts 60 are continuously closed, the value indicated when the first stage is energized will be that determined by R1 and so on.

To calibrate the apparatus, including the sample measuring circuit which provides the input signal, and to establish the desired relationship or transfer function between the measured parameter and the readout, a succession of predetermined calibration samples or standards are fed to the measuring device while the switch S1 is closed and the switch S3 is in its right hand position. The standards are applied in order and, as each of the calibration samples is measured, the shift register is advanced to the corresponding state by the STEP signal so that the respective ones of the selection relay winding 41-45 and storage set relay winding 31-35 are energized. In this mode, as described previously, the output voltage provided by each storage circuit 15-19 is adjusted by feedback control so as to be equal to the level of the input signal produced by the respective calibration sample.

To process a test sample, the switch S1 is opened, the switch S3 is placed in its left hand position and an interrogation pulse is applied to clear and rest the shift register 27. As described previously, the register is then advanced under the control of the clock oscillator until the measuring circuit voltage falls between the two stored calibration voltage levels provided by the then energized selection relay. Due to the closing of the contacts 76, the apparatus then automatically goes into its interpolation mode of operation in which the d.c. level of the feedback signal is adjusted, by time division interpolation, between the two stored calibration voltage levels, so as to be equal to the input voltage provided by the measuring circuit. This same time division interpolation is applied to the respective pair of output voltage reference levels so as to generate an actual output voltage which is related to the two reference voltage levels in the same manner as the input signal is related to the respective pair of calibration voltage levels.

While the setting of various switches to change between the several modes of operation, i.e., reference level adjust, calibration, and test sample measurement have been described in terms of manual control, it should be understood that the present apparatus will typically be used as a component of a larger automatic analysis equipment and that the change from one mode to another, as well as the application of measuring circuit voltages and interrogation commands, may be under the control of the programming system which supervises or sequences the overall operation of the entire analysis equipment. However, as the design of such sequencing controls is within the capabilities of those skilled in the art and since these elements are not part of the present invention itself, this control circuitry has not been disclosed in detail in the present application. It should be understood, however, that either manual or automatic supervision is contemplated and should thus be understood to be within the scope of the appended claims.

While the embodiment illustrated in FIG. 2 employs magnetic reed relays for the switching means which performs the interpolation function, it should be understood that various other types of switching devices could also be used and could be arranged in various circuits for repetitively alternating between two voltages. For example, the interpolation switching relay contacts could be replaced by field-effect transistors since these latter devices are well adapted to switching functions and the switched circuit is essentially linear or resistive in nature. The use of such switching devices may be desirable where higher frequency switching is needed.

Likewise, more or fewer calibration and reference points may be employed. While more points might be needed to accurately synthesize an unusually complex transfer function, many purposes are adequately fulfilled by employing two calibration points. It may be noted that the use of even just two arbitrarily preselectable reference points can allow the most frequently used portion of a transfer or response characteristic to be quite accurately matched in most cases. Since both of the end points may be essentially arbitrarily located, it may be noted that this permits a much more flexible adjustment of response than a system in which one reference point is inherently the origin or "zero point" of both the response and the output. If the origin is used, the adjustment possible in a linear response system then amounts to only a "gain" adjustment, as is conventional.

Figure 3:
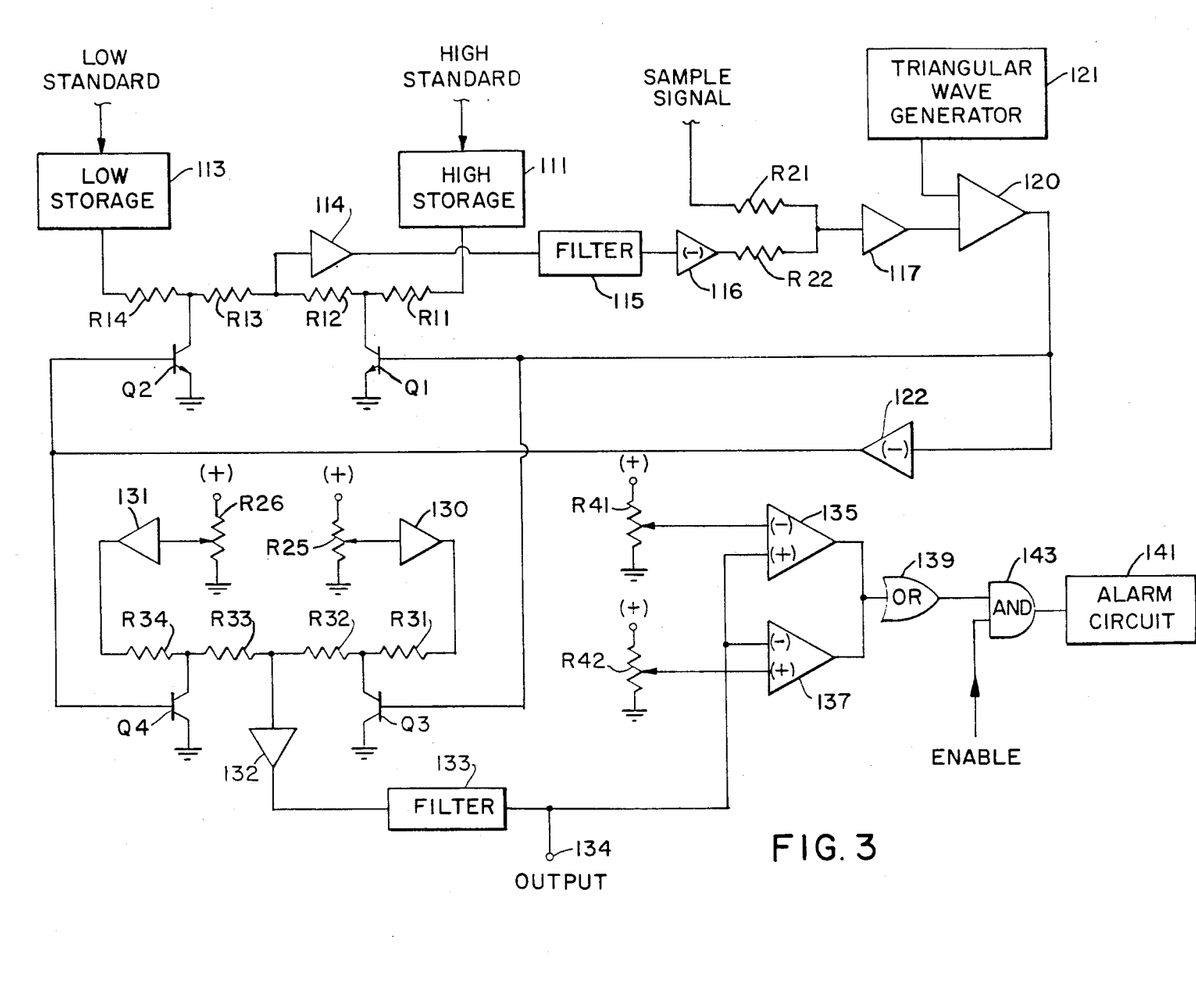
FIG. 3 is a block diagram of a somewhat simpler embodiment which is additionally provided with mid-range checking circuitry.

In FIG. 3, a system is illustrated in which the interpolation function is based upon two reference points as discussed above. In addition, this embodiment incorporates a system for essentially automatically checking the operation of the system, including the accuracy of the interpolation process.

A pair of storage circuits 111 and 113 are provided for holding the voltage levels produced by the measuring circuit when high and low calibration samples, respectively, are submitted to the measuring device. These storage circuits may be loaded in the same manner as the storage circuits 15-19 of the embodiment of FIG. 2, though a detailed description of such sample-and-hold circuitry is not repeated here.

In the FIG. 3 embodiment, the voltages held by the storage circuits 111 and 113 are combined in a resistive mixing network comprising four resistors R11-R14. The interpolation switching function is provided by a pair of NPN transistors Q1 and Q2, rather than by reed relays, the two transistors being energized alternately by circuitry described in greater detail hereinafter. When energized, the transistor Q1 shunts the junction between resistor R11 and resistor R12 to ground. Likewise, when energized, the transistor Q2 shunts the junction between resistor R13 and resistor R14 to ground. An output signal is taken from between resistors R12 and R13.

From the foregoing, it can be seen that, when the transistor Q1 is energized and Q2 is de-energized, only the lower of the stored calibration voltages contributes to the output voltage. In the opposite situation, on the other hand, only the higher of the stored calibration voltages contributes to the output. The output signal generated by the alternate energization of the transistors Q1 and Q2 is applied to a low-pass filter 115 through a buffer amplifier 114. The gain of amplifier 114 may be conveniently adjusted to compensate for any attenuation caused by the resistive mixing network R11-R14. Accordingly, the d.c. output voltage provided by the filter 115 will lie at a value between the two stored calibration voltages, the actual value being a function of the duty cycle of the switching transistors Q1 and Q2. This d.c. voltage, which may be considered to be analagous to the feedback signal referred to in describing the previous embodiment, is inverted, as indicated at 114 and is then mixed or balanced against the measuring circuit input signal in a resistive network comprising resistors R21 and R22. The net signal resulting is in essence an error signal. This signal is amplified, as indicated at 117, and the amplified signal is applied to one input of an operational amplifier 120. As described hereinafter, amplifier 120 functions as a comparator circuit.

Figure 4A:
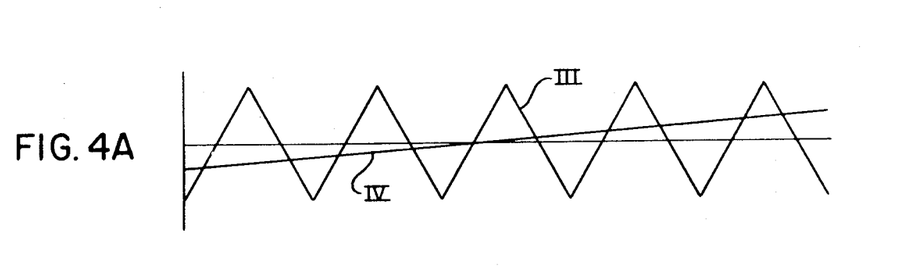
FIGS. 4A and 4B represent waveforms generated in the apparatus of FIG. 3 and are useful in describing the duty cycle modulation employed therein.
Figure 4B:
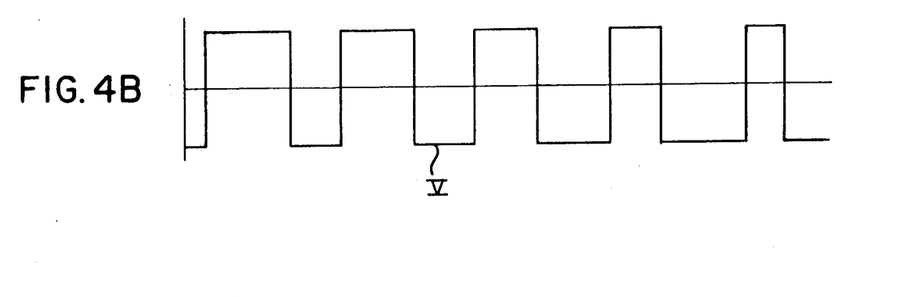

A signal in the nature of a triangular wave is applied to the other input of comparator amplifier 120 by a wave generator or oscillator 121. Comparator amplifier 120 operates to compare the values of the two input signals applied thereto and to generate a positive output voltage when the error signal is more positive then the voltage of the triangular waveform and to generate a negative output voltage when the opposite situation exists. As the one input to comparator amplifier 120 comprises a triangular waveform and the other comprises an essentially d.c. level, it can be seen that the time or phase within each cycle of the triangular waveform where the two voltages cross will depend upon the value of the d.c. level, i.e., error signal. Accordingly, the output signal from the comparator amplifier 120 will comprise a train of squarewave pulses, the duration or "width" of each pulse being variable as a function of the amplitude of the error signal. This operation is illustrated in FIGS. 4A and 4 B. In FIG. 4A, the triangular waveform is indicated at III and a slowly increasing error signal is indicated at IV. The output signal from comparator amplifier 120 is represented at V in FIG. 4B. As may be seen, the switching duty cycle being controlled by the signal V varies as a function of the amplitude of the error signal. Essentially the same modulation system is employed in the embodiment of FIG. 2, though not illustrated in detail in that drawing for the purpose of simplicity. The output signal from the comparator amplifier 120 controls the energization of transistor Q1 directly and, through an inverter 122, the other switching transistor Q2.

Since the duty cycle of the switching provided by transistors Q1 and Q2 controls the d.c. amplitude of the error signal as described previously, it can be seen that a feedback loop is established. As with the previous embodiment, the feedback is applied in a polarity or a sense tending to adjust the feedback signal to a value which is essentially equal to the input signal, although it is opposite in polarity in this particular embodiment.

Having adjusted the duty cycle of switching to balance the feedback signal against the measuring circuit input signal, the same duty cycle switching is applied to interpolate between a pair of output reference potentials. In the FIG. 3 embodiment, the reference potentials corresponding to the high and low standards are provided by a pair of potentiometers R25 and R26, respectively. These preselectable reference voltages are applied, through respective buffer amplifiers 130 and 131, to a mixing network comprising resistors R31-R34, this network being essentially identical to the network comprising resistors R11-R14.

Again, the output signal from the network is taken from between the two middle resistors R32 and R33. Likewise, a pair of NPN switching transistors Q3 and Q4 are connected for selectively shunting the remaining intermediate junctions to ground. Transistor Q3 is driven synchronously with transistor Q1, while transistor Q4 is driven synchronously with transistor Q2. Thus, the same duty cycle of switching is applied to the output reference voltages as is applied to the stored calibration voltages. The output voltage is amplified as indicated at 132 and filtered as indicated at 133 so as to obtain, at an output terminal 134, a d.c. voltage which bears the same relationship to the two output reference voltages as the measuring circuit input voltage bears to the two stored calibration voltages.

Proper operation of this apparatus may be checked by applying to the measuring circuit a third preconstructed standard or calibration sample which may be conveniently referred to as a mid-range standard. While the mid/or half-way point is convenient and is assumed in the embodiment described, other intermediate points between the two original calibration values may also be used, if desired.

Assuming that the apparatus, including the interpolation procedure, is operating properly, the mid-point reference standard will produce an output voltage which is midway between the high and low output reference voltages. To confirm that the output voltage produced during a mid-range standard test is within the desired accuracy, the output voltage generated during the mid-range test is compared with upper and lower limits for the acceptable reading. These upper and lower limit values are established by means of a pair of potentiometers R41 and R42, respectively. The upper limit voltage is applied to the inverting input terminal of a first comparator amplifier 135, while the lower limit voltage is applied to the non-inverting input terminal of a second comparator amplifier 137. The output voltage is applied to the remaining input terminal of both comparator amplifiers. As may be seen, the output voltage from comparator amplifier 135 will be positive if the output voltage is above the upper limit voltage, while the output signal from the comparator amplifier 137 will be positive if the output voltage is below the lower limit.

The output signals from the two comparator amplifiers 135 and 137 are combined in an OR gate 139 to provide an output signal which will be positive if either of the comparator amplifier output signals is positive. It will thus be seen that a positive signal will be obtained from the OR gate 139 unless the output signal lies between the limits preselected by the settings of the potentiometers R41 and R42. The signal from OR gate 139 is, in turn, used to trigger an alarm circuit 141 through an intermediate AND gate 143. The AND gate 143 permits the alarm circuit 141 to be receptive to these limit-condition signals only when an enable signal is applied, as indicated. Such an enabling signal may be provided by external sequence control circuitry, not shown. As will be understood, the alarm circuit will be enabled only during the mid-range test itself since other test samples being measured by the apparatus will typically produce readings outside the range established by the two limit voltages though within the range between the two reference voltages.

Figure 5:
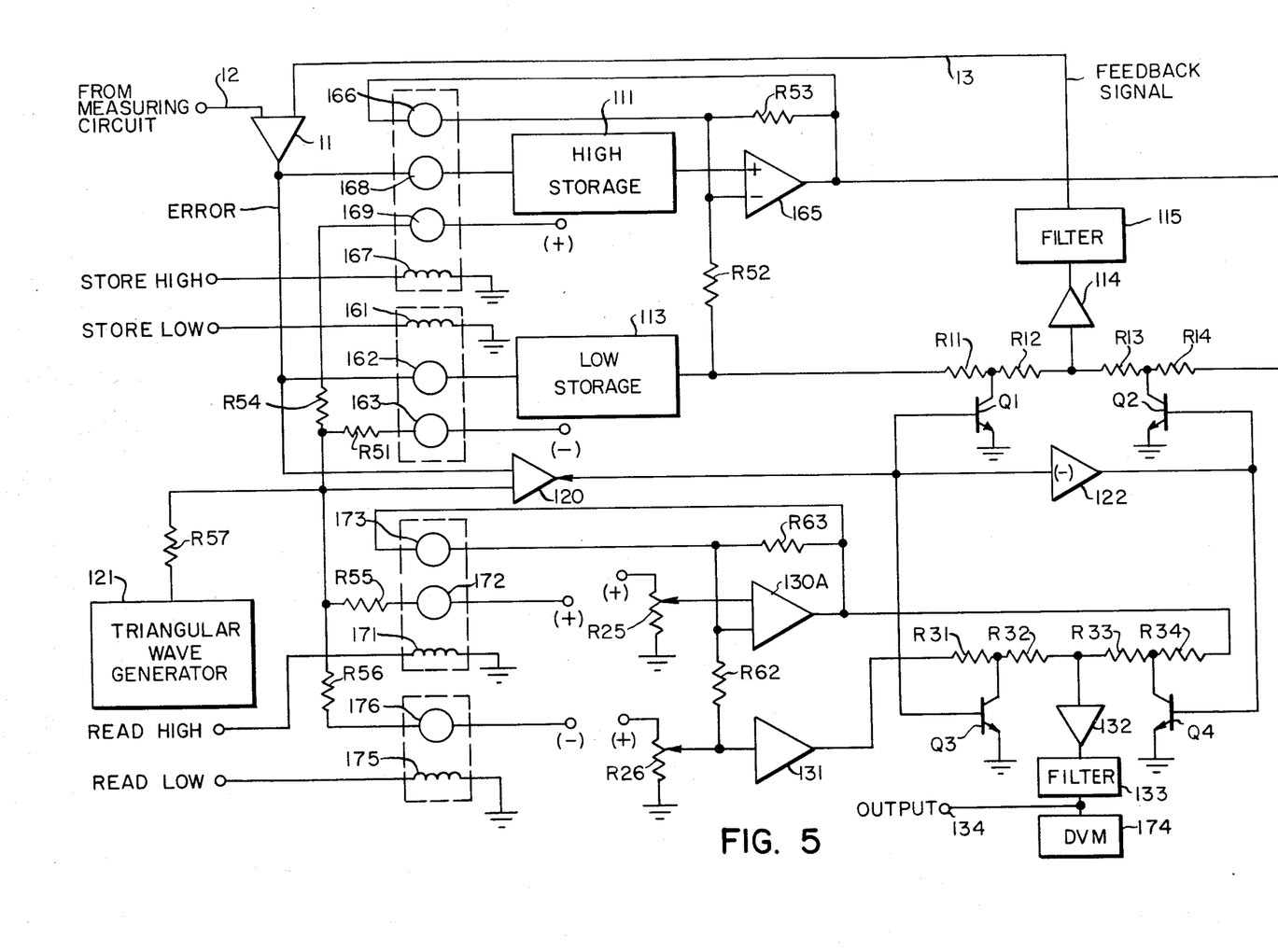
FIG. 5 is a block diagram of a further embodiment providing extrapolation.

In the embodiments disclosed thus far, it has been assumed that each unknown sample being measured will fall between a pair of calibration samples. However, in some circumstances it may be useful to allow the system to measure the value of a sample which falls outside the range established by the stored calibration sample values. In this way, the calibration samples can be selected so as to provide high accuracy over the range within which most samples will fall but the system will still provide a measurement, though perhaps of reduced accuracy, of a sample falling outside that range. In other words, it is advantageous if the system can extrapolate from as well as interpolate between values established by calibration samples. The embodiment illustrated in FIG. 5 provides for high-end extrapolation in a two-point system. This embodiment basically employs the transistor type interpolative switching of the embodiment of FIG. 3. However, also shown are the connections for including the interpolation circuitry within the feedback loop which operates during calibration sample storage operation, i.e. in the manner described previously with reference to the embodiment of FIG. 2.

The interpolative synthesizing circuit which generates the feedback signal comprises transistors Q1, Q2, the network of resistors R11–R14, buffer amplifier 114 and filter 115, while the interpolative switching circuit which synthesizes the output signal comprises transistors Q3 and Q4, the network of resistors R31–R34, buffer amplifier 132 and filter 133. The feedback signal is provided, through lead 13, to the differential input amplifier 11 for comparison with the input signal coming through lead 11.

The FIG. 5 embodiment likewise includes the storage circuits 111 and 113 for storing the value of input signal provided by the high and low calibration samples respectively. However, while the feedback signal synthesizing circuitry employs the low stored value to determine one end of its operating range as in the previous embodiments, the high end of its operating range is determined as a function of both the high and low stored calibration values, rather than as a function of just the high stored value as in the previous embodiments.

The signal which is applied to the resistor R14 and thereby defines the high end of the feedback signal synthesizing range is obtained from a differential amplifier 165. The output signal from the high storage circuit 111 is applied directly to the positive (in-phase) input terminal of the amplifier 165, while the output signal from the low storage circuit 113 is applied to the negative (inverting) input terminal of amplifier 165 through a mixing resistor R52. Negative feedback from the output terminal of amplifier 165 is also applied to the inverting input terminal through a resistor R53. Resistor R53 can, however, be selectively shorted out by a set of contacts 166. In the embodiment illustrated, the resistors R52 and R53 are assumed to be of equal value. As will be understood by those skilled in the art, the output signal from amplifier 165 will thus be essentially equal to the output signal from the high storage circuit 111 when the feedback resistor R53 is shorted out but will be equal to the output signal from the high storage circuit plus the absolute difference between the output voltages of the two storage circuits when the contacts 166 are open. Thus, the opening of contacts 166 in effect doubles the ranges of the feedback signal synthesizing circuitry since the difference between the voltages applied at the two ends of the resistive network R11–R14 is doubled.

The range of the output signal synthesizing circuitry is likewise expanded. As in the FIG. 3 embodiment, the voltages provided by the potentiometers R25 and R26 are adjusted to equal the output voltages desired for the high and low calibration samples respectively. The lower voltage is applied, through a unity gain buffer amplifier 131 directly to the appropriate side of the interpolative circuitry, i.e. to the resistor R31. The voltage determining the other end of the interpolation range is, however, obtained from a differential amplifier 130A. The higher reference voltage, provided by potentiometer R25, is applied to the in-phase input terminal of amplifier 130A while the lower reference voltage, provided by potentiometer R26, is applied to the inverting input terminal of that amplifier through a mixing resistor R62. Negative feedback from the output terminal is applied to this same input terminal through a resistor R63. Resistor R63 can be selectively shorted out by a pair of relay contacts 173. Assuming that the resistors R62 and R63 are of equal value, it can be seen that the output signal interpolation range can be selectively expanded in proportion to the expansion of the feedback signal synthesis range.

As in the FIG. 3 embodiment, the duty cycle of the interpolative switching circuitry can be controlled by a differential amplifier 120 which compares a signal obtained from a triangular wave generator 121, through isolating resistance R57, and the error signal provided by input amplifier 11. However, as described hereinafter, the interpolative switching circuitry can be locked to one side or the other for sample value storing by means of a d.c. bias applied so as to override the triangular waveform. To store the value of input signal produced by a high calibration sample, a relay winding 167 is energized which closes contacts 166, 168 and 169. The contacts 166 short out the feedback resistor R53 as discussed previously while the contacts 169 biases the duty cycle control amplifier 120 so that no repetitive switching takes place and the feedback signal becomes equal to the output signal from the high storage circuit 111. At the same time, the closure of the contacts 168 applies the error signal from the input amplifier 11 to the input circuit of the storage circuit 111. Accordingly, a feedback loop is established which causes the output signal from the storage circuit 111 to be adjusted to a value equal to the input signal at that time. When the relay winding 167 releases, this value is maintained or held by the storage circuit 111 as in the previous embodiments.

Storage of the input signal value produced by a low value calibration sample proceeds in a similar manner. Energization of a relay winding 161 causes the closure of contacts 162 which apply the error signal to the input of the low storage circuit 113 and also the closure of contacts 163 which affect the biasing of the duty cycle control amplifier in such a manner that repetitive switching is terminated and the feedback signal is caused to equal the voltage provided by the low storage circuit 113.

In addition to being provided to an output terminal 134, the output signal obtained from the output signal synthesizing circuitry is applied to a digital voltmeter 174 which is used in initially setting or adjusting the output reference voltages. A relay winding 171 is energized when it is desired to read the high output reference voltage. This closes the contacts 173 thereby eliminating the range expansion provided by amplifier 130A. Energization of this winding also closes a set of contacts 172 which overrides the input to the amplifier 120 so that the interpolative switching circuit is locked in the corresponding state, i.e. so that only the high input reference voltage contributes to the net output voltage appearing on terminal 134. A relay winding 175 is energized when it is desired to produce a complementary action so as to read only the high output reference voltage on the digital voltmeter 174, this winding being operative to so close the set of contacts 176 which applies an overriding negative current, through a resistor R56, to the input of amplifier 120.

Summarizing, the operation of this embodiment is essentially as follows. When a low value calibration sample is being measured, the relay winding 161 is energized so that the output signal from the low storage circuit 113 is adjusted, by feedback operation, to a value equal to the output signal from the measuring circuit at that time. Likewise, during measuring of a high value calibration sample, the relay winding 167 is energized so that the output signal from the high storage circuit is adjusted, again by feedback operation, to a value equal to the output signal from the measuring circuit at that time. Since the resistor R53 is shorted out during this latter operation by the contacts 166, the stored value will be equal to the signal from the measuring circuit rather than being scaled to the difference between the two stored values.

In order to adjust the potentiometers R25 and R26 so that the digital voltmeter 174 will provide readings with the desired correspondence to the values of the high and low calibration samples, the relay windings 171 and 175 may be energized in turn. When the relay winding 175 is energized, the digital voltmeter 174 will indicate only the contribution from the potentiometer R26 and thus this potentiometer may be adjusted to provide the indication desired for a sample equal in value to the low calibration sample. Likewise, when the relay 171 is energized, the digital voltmeter 174 will respond essentially only to the contribution of the high output reference signal to the output signal and thus the potentiometer R25 may be adjusted to produce the desired indication for the value of the high calibration sample. Since the resistor R63 is shorted out during this latter adjustment, it can be seen that the digital voltmeter reading will be responsive only to the reference voltage provided by the potentiometer R25 and not to the difference in the voltages provided by the two reference potentiometers.

From the foregoing, it can be seen that calibration sample value storing and output reference signal source adjusting take place in a manner essentially identical to that provided in the previous embodiments. In other words, the values actually stored are values which correspond one for one with the voltages provided by the measuring circuit when the calibration samples are processed and the output reference voltages to which the potentiometers R25 and R26 likewise correspond on a one-for-one basis with the desired readout values corresponding to the calibration samples. During measurement of an unknown sample, however, the contacts 166 and 173 are left open. Accordingly, the synthesis of the feedback signal is based upon an expanded voltage range, the high end being not only a function of the high stored value held by the circuit 111 but also of the difference between the high and low stored voltages. In the embodiment illustrated, the expansion is by a factor of two since the resistors R53 and R52 are of equal value. However, it may in general be noted that the upper end of the range may be defined as being $B + k (B - A)$ where $A$ is the voltage provided by the low storage circuit 113, $B$ is the voltage provided by the high storage circuit 111 and $k$ is a factor determined by the relative values of the resistors R53 and R52.

While the synthesis of the feedback signal is based on an expanded range as just described, the correspondence between output signals and stored calibration values is preserved since the synthesis of the output signal is based upon an expanded range in similar manner. While the contacts 173 are open, it can be seen that the upper of the output-range-defining voltages can be defined as $K + k (K - L)$, where $K$ is the output reference voltage provided by the potentiometer R25, $L$ is the output reference voltage provided by the potentiometer R26 and $k$ is a proportionality constant determined by the relative values of the resistances R63 and R62, the ratio of these resistances being equal to the ratio of the resistances R53 and R52.

By expanding the range of synthesis of both the feedback signal and the output signal in precisely similar manner, the calibration samples can be chosen so as to define the range in which most samples will fall and yet the apparatus will respond to signals outside that range while preserving the desired correspondence between input signals and output signals, i.e. the scale transform operation provided by the apparatus of the present invention in all of its embodiments. Since the range expansion is provided only during measurement of an unknown sample and not during the storing of calibration sample values or during the adjustment of output reference values corresponding to the storage signals, it can be seen that the operator of the apparatus does not have to concern himself with the scale expansion. Rather, the adjustments of the potentiometers R25 and R26 are based on the actual known or predetermined values of the calibration samples and not upon any scaled difference between them. While the embodiment illustrated in FIG. 5 employs an interpolation expansion or extrapolation on a factor of 2 to 1, it can readily be seen that other expansion factors may be provided by changing the proportionality factor relating resistor R53 to resistor R52 and resistor R63 to resistor R62. Likewise, while only upwards scale expansion has been provided in this embodiment, it can readily be seen that expansion in both directions may be provided by causing the low end of each range to be scaled downwards as well as causing the upper end to be scaled upwards as in the present embodiment. As will be understood, the feedback synthesis and the output synthesis must be scaled similarly so that the desired correspondence of input signal from the measuring circuit and output signal is preserved.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a system employing a sample measuring circuit operative to provide a signal voltage which is a function of a sought characteristic of a sample being measured; readout apparatus for providing, in response to a test sample, an output voltage which is related to two preselectable reference voltages in the same manner as the signal voltage provided by said measuring circuit in response to the test sample is related to two calibration voltages, said readout apparatus comprising:
   at least a pair of adjustable output voltage reference sources;
   at least a pair of calibration voltage circuits, each of said calibration voltage circuits being adjustable to provide a calibration voltage at a level corresponding to the signal voltage provided by said sample measuring circuit in response to a respective calibration value;
   a first interpolation switching circuit which is adapted to repetitively switch between the two calibration voltages thereby to provide an average voltage which is between the two calibration voltages at an interpolation point which is a function of the duty cycle of the switching;
   means for repetitively operating said switching circuit, including servo loop means for varying the switching duty cycle to adjust said average voltage to a value corresponding to the signal voltage provided by said sample measuring circuit when a test sample is being measured; and
   a second interpolation switching circuit which is operated in synchronism with said first interpolation switching circuit and which repetitively switches between the two output voltage reference sources thereby to provide an output voltage whose average value is related to the two reference source voltages in the same manner as the average voltage provided by said first switching circuit is related to the two calibration voltages.

2. In a system employing a sample measuring circuit operative to provide a signal voltage which is a function of a sought characteristic of a sample being measured; readout apparatus for providing, in response to a test sample, an output voltage which is related to two preselectable reference voltages in the same manner as the signal voltage provided by said measuring circuit in response to the test sample is related to two signal voltages provided the same said measuring circuit in response to respective calibration samples, said apparatus comprising:
   at least a pair of adjustable output voltage reference sources;
   at least a pair of calibration voltage storage circuits;
   means for setting the calibration voltage held by each of said storage circuits to a level corresponding to the signal voltage provided by said sample measuring circuit in response to a respective calibration sample;
   a first interpolation switching circuit which is adapted to repetitively switch between the two voltages held by said storage circuits thereby to provide an average voltage which is between the two stored voltages at an interpolation point which is a function of the duty cycle of the switching;
   means for repetitively operating said switching circuit including servo loop means for varying the switching duty cycle to provide an average voltage having a value corresponding to the signal voltage provided by said sample measuring circuit when a test sample is being measured; and
   a second interpolation switching circuit which is operated in synchronism with said first interpolation switching circuit and which repetitively switches between the two output voltage reference sources thereby to provide an output voltage whose average value is related to the two reference source voltages in the same manner as the average voltage provided by said first switching circuit is related to the two stored calibration voltages.

3. Readout apparatus as set forth in claim 2 wherein said adjustable output voltage reference sources comprise manually adjustable potentiometers.

4. Readout apparatus as set forth in claim 2 wherein said calibration voltage storage circuits comprise integrator circuits having leakage time constants which are relatively long with respect to the operating cycle of said system.

5. Readout apparatus as set forth in claim 2 wherein said calibration voltage storage circuits comprise sample and hold circuits which sample when respective calibration samples are being measured by the sample measuring circuit.

6. Readout apparatus as set forth in claim 2 wherein said first and second interpolation switching circuits comprise reed relays.

7. Readout apparatus as set forth in claim 2 wherein said first and second interpolation switching circuits each comprise a pair of transistors which are alternately energized.

8. Readout apparatus as set forth in claim 2 wherein each of said interpolation switching circuits includes a low pass filter and the switching circuit operates to apply the respective pair of voltages alternately to said filter and said filter provides an essentially d.c. voltage which lies between the respective pair of voltages at a value which is variable as a function of the duty cycle of the switching.

9. Readout apparatus as set forth in claim 2 wherein said means for repetitively operating said switching circuit comprises:
   a triangular wave generator;
   means for generating an error signal which is a function of the difference between the signal voltage provided by said sample measuring circuit and the average voltage provided by said first interpolation switching circuit;
   means for comparing the amplitude of the error signal with the instantaneous value of the waveform provided by said triangular wave generator and for controlling said first switching circuit to select a first one of said stored voltages when the error signal exceeds the triangular waveform voltage and to select the other of said stored voltages when the triangular waveform voltage exceeds the error signal.

10. Readout apparatus as set forth in claim 2 further comprising:
    an upper limit voltage reference source;
    a lower limit voltage reference source;
    means for comparing the average value of the output voltage provided by said second interpolation switching circuit with each of the limit voltages provided by said limit voltage reference sources; and
    means for providing an alarm signal if the average value of the output voltage generated by said second interpolation switching circuit is not between the two limit voltages when a preconstructed mid-range calibration sample is being measured by said sample measuring circuit.

11. In a system employing a sample measuring circuit operative to provide a signal voltage which is a function of a sought characteristic of a sample being measured; readout apparatus for providing, in response to a test sample, an output voltage which is related to two preselectable reference voltages in the same manner as the signal voltage provided by said measuring circuit in response to the test sample is related to two signal voltages provided the same said measuring circuit in response to respective calibration samples, said apparatus comprising:
    at least a pair of adjustable output voltage reference sources;
    at least a pair of sample and hold calibration voltage storage circuits each of which employs feedback means for setting the respective voltage held to a level corresponding to the signal voltage provided by said sample measuring circuit during measurement of a respective calibration sample;
    a first interpolation switching circuit which is adapted to repetitively switch between the two voltages held by said storage circuits thereby to provide an average voltage which is between the two stored voltages at an interpolation point which is a function of the duty cycle of the switching;
    means for repetitively operating said switching circuit including servo loop means for varying the switching duty cycle to provide an average voltage having a value corresponding to the signal voltage provided by said sample measuring circuit when a test sample is being measured; and
    a second interpolation switching circuit which is operated in synchronism with said first interpolation switching circuit and which repetitively switches between the two output voltage reference sources thereby to provide an output voltage whose average value is related to the two reference source voltages in the same manner as the average voltage provided by said first switching circuit is related to the two stored calibration voltages.

12. In a system employing a sample measuring circuit operative to provide a signal voltage which is a function of a sought characteristic of a sample being measured; readout apparatus for providing, in response to a test sample, an output voltage which is related to two preselectable reference voltages in the same manner as the signal voltage provided by said measuring circuit in response to the test sample is related to two signal voltages provided the same said measuring circuit in response to respective calibration samples, said apparatus comprising:
    a plurality of calibration voltage storage circuits;
    means for setting the calibration voltage held by each of said storage circuits to a level corresponding to the signal voltage provided by said sample measuring circuit in response to a respective calibration sample;
    means for comparing the signal voltage provided by said sample measuring circuit when a test sample is being measured with successive ones of said stored calibration voltages and for selecting the pair of stored calibration voltages between which lies the value of the test sample signal voltage;
    a plurality of adjustable output voltage reference sources corresponding to said calibration voltage storage circuits;
    means for selecting the pair of output voltage reference sources corresponding to the selected stored calibration voltages;
    a first interpolation switching circuit which is adapted to repetitively switch between the two selected stored voltages thereby to provide an average voltage which is between the two selected stored voltages at an interpolation point which is a function of the duty cycle of the switching;
    means for repetitively operating said switching circuit including servo loop means for varying the switching duty cycle to provide an average voltage having a value corresponding to the signal voltage provided by said sample measuring circuit when the test sample is being measured; and
    a second interpolation switching circuit which is operated in synchronism with said first interpolation switching circuit and which repetitively switches between the two selected output voltage reference sources thereby to provide an output voltage whose average value is related to the two reference source voltages in the same manner as the average voltage provided by said first switching circuit is related to the two stored calibration voltages.

13. In a system employing a sample measuring circuit operative to provide a signal voltage which is a function of a sought characteristic of a sample being measured; readout apparatus for providing, in response to a test sample, an output voltage which corresponds to two preselectable reference voltages as the signal voltage provided by said measuring circuit, in response to the test sample, corresponds to the signal voltages provided the same said measuring circuit in response to a pair of calibration samples, said apparatus comprising:
   a pair of adjustable output voltage reference sources;
   a pair of calibration voltage storage circuits;
   means for setting the calibration voltage held by each of said storage circuits to a level corresponding to the signal voltage provided by said sample measuring circuit in response to a respective calibration sample;
   means providing a first range defining voltage having a value which is a function of at least one of said stored voltages;
   means providing a second range defining voltage which is a function of one of the stored voltages and of the difference between the two stored voltages;
   a first interpolation switching circuit which is adapted to repetitively switch between the two range defining voltages thereby to provide an average voltage which is between the two range defining voltages at an interpolation point which is a function of the duty cycle of the switching;
   means for repetitively operating said first switching circuit including servo loop means for varying the switching duty cycle to provide an average voltage having a value proportional to the signal voltage provided by said sample measuring circuit when a test sample is being measured; and
   a second interpolation switching circuit which is operated in synchronism with said first interpolation switching circuit and which repetitively switches between the two output voltage reference sources thereby to provide an output voltage whose average value is a function of the signal voltage provided by the measuring circuit in response to a test sample.

14. In a system employing a sample measuring circuit operative to provide a signal voltage which is a function of a sought characteristic of a sample being measured; readout apparatus for providing, in response to a test sample, an output voltage which corresponds to two preselectable reference voltages as the signal voltage provided by said measuring circuit, in response to the test sample, corresponds to the signal voltages provided the same said measuring circuit in response to a pair of calibration samples, said apparatus comprising:
   a pair of calibration voltage storage circuits;
   switching means for selectively interconnecting said measuring circuit and said first storage circuit during measurement of a first calibration sample for storing a voltage, designated A, proportional to that produced by said measuring circuit in response to said first calibration sample and for selectively interconnecting said measuring circuit and said second storage circuit during measurement of a second calibration sample for storing a voltage, designated B, proportional to that produced by said measuring circuit in response to said second calibration sample;
   means interconnected with said first and second storage circuits for providing a first range defining voltage equal to A and second range defining voltage equal to $B + k(B - A)$ where $k$ is a preselected constant;
   first and second adjustable voltage sources providing preselectable voltages designated K and L respectively;
   means interconnected with said voltage sources for providing a first output limit voltage equal to K and a second output limit voltage equal to $K + k(K - L)$;
   a first interpolation switching circuit which is adapted to repetitively switch between the two range defining voltages thereby to provide an average voltage which is between the two range defining voltages at an interpolation point which is a function of the duty cycle of the switching;
   means for repetitively operating said first switching circuit including servo loop means for varying the switching duty cycle to provide an average voltage having a value proportional to the signal voltage provided by said sample measuring circuit when a test sample is being measured; and
   a second interpolation switching circuit which is operated in synchronism with said first interpolation switching circuit and which repetitively switches between the two output voltage limit voltages thereby to provide an output voltage whose average value corresponds to the two preselected voltages K and L as the signal voltage provided by the measuring circuit corresponds to the stored voltages A and B.

15. In a system employing a sample measuring circuit operative to provide a signal voltage which is a function of a sought characteristic of a sample being measured; readout apparatus for providing, in response to a test sample, an output voltage which corresponds to two preselectable reference voltages as the signal voltage provided by said measuring circuit, in response to the test sample, corresponds to the signal voltages provided the same said measuring circuit in response to a pair of calibration samples, said apparatus comprising:
   a pair of calibration voltage storage circuits;
   switching means for selectively interconnecting said measuring circuit and said first storage circuit during measurement of a first calibration sample for storing a voltage, designated A, proportional to that produced by said measuring circuit in response to said first calibration sample and for selectively interconnecting said measuring circuit and said second storage circuit during measurement of a second calibration sample for storing a voltage, designated B, proportional to that produced by said measuring circuit in response to said second calibration sample;
   means interconnected with said first and second storage circuits for providing a first and second range end voltages defining a first interpolation voltage range which includes the values between A and B and which extends substantially beyond those values in at least one direction;
   first and second adjustable voltage sources providing preselectable voltages designated K and L respectively;

means interconnected with said voltage sources for providing a first and second output limit voltages defining a second interpolation voltage range which includes the values between K and L and which extends substantially beyond those values in at least one direction, said second interpolation range corresponding to K and L as said first interpolation range corresponds to A and B;

a first interpolation switching circuit which is adapted to repetitively switch between the two range defining voltages thereby to provide an average voltage which is between the two range defining voltages at an interpolation point which is a function of the duty cycle of the switching;

means for repetitively operating said first switching circuit including servo loop means for varying the switching duty cycle to provide an average voltage having a value proportional to the signal voltage provided by said sample measuring circuit when a test sample is being measured; and a second interpolation switching circuit which is operated in synchronism with said first interpolation switching circuit and which repetitively switches between the two output voltage limit voltages thereby to provide an output voltage whose average value corresponds to the two preselected voltages K and L as the signal voltage provided by the measuring circuit corresponds to the stored voltages A and B.

* * * * *